A. J. FRASE.
FLIGHT ATTACHMENT FOR CONVEYERS.
APPLICATION FILED APR. 23, 1909.

956,520.

Patented May 3, 1910.

Witnesses
Jos Gregory
M. J. Miller

Inventor
Albert J. Frase.

By Chandler & Chandler
Attorneys

UNITED STATES PATENT OFFICE.

ALBERT J. FRASE, OF BRECKENRIDGE, MINNESOTA.

FLIGHT ATTACHMENT FOR CONVEYERS.

956,520.  Specification of Letters Patent.  Patented May 3, 1910.

Application filed April 23, 1909. Serial No. 491,662.

*To all whom it may concern:*

Be it known that I, ALBERT J. FRASE, a citizen of the United States, residing at Breckenridge, in the county of Wilkin, State of Minnesota, have invented certain new and useful Improvements in Flight Attachments for Conveyers; and I do hereby declare the following to be a full, clear, and exact description of the invention, such as will enable others skilled in the art to which it appertains to make and use the same.

This invention relates to conveyers and more especially to a novel means of securing the flights on conveyers.

It is a well known fact that when the ordinary manner of securing conveyer flights to conveyer belts is employed the belt is frequently torn away from the flight as the latter moves over the drums at the end of the conveyer.

The principal object of the present invention is to provide a novel means for attaching conveyer flights to conveyer belts in such manner that the attachment will have equal flexibility with the belt while the conveyer will be securely held thereon.

Another object of the invention is to provide a novel means whereby the conveyer flights may be attached to the belt in the manner above described and yet be readily removable for repairs or replacement.

With the above and other objects in view the invention consists in general of a conveyer provided with a series of flights secured to the conveyer belt in a novel and improved manner.

The invention further consists in certain novel details of construction and combinations of parts hereinafter fully described, illustrated in the accompanying drawings, and specifically set forth in the claims.

Figure 1:
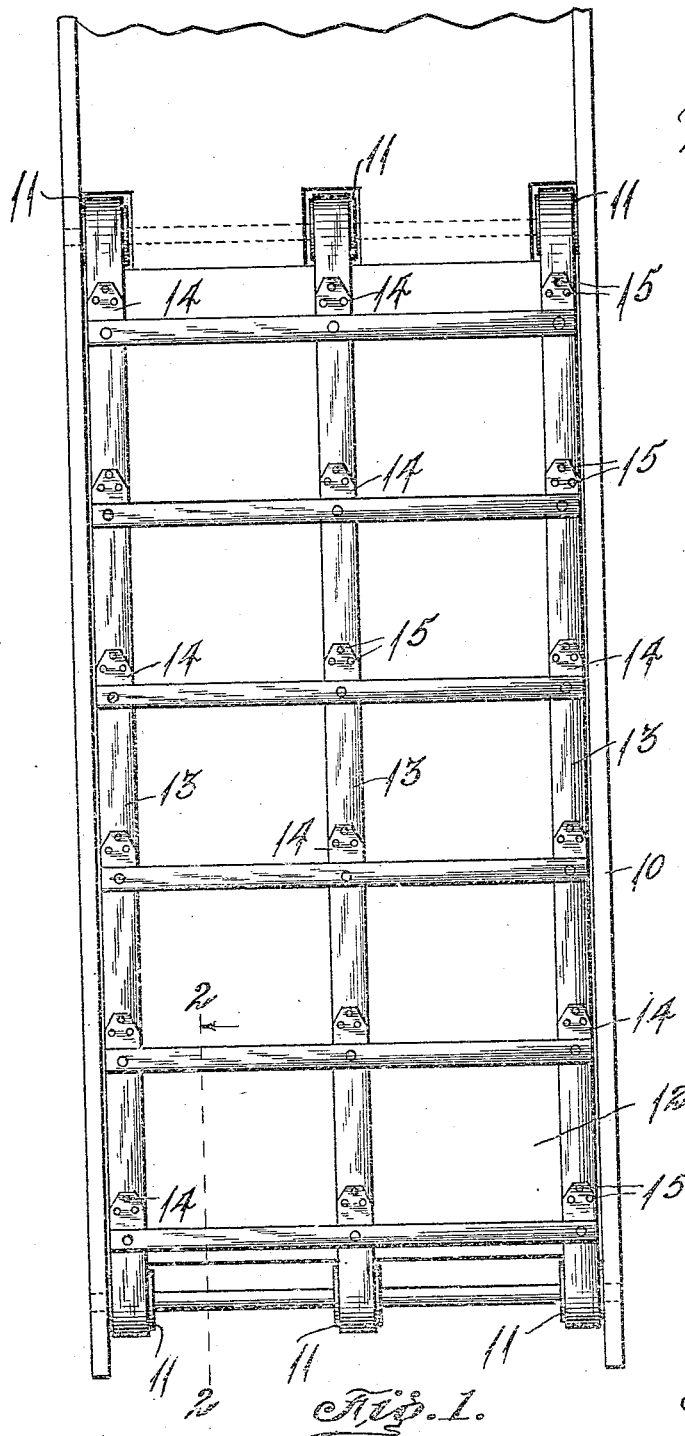
Figure 3:
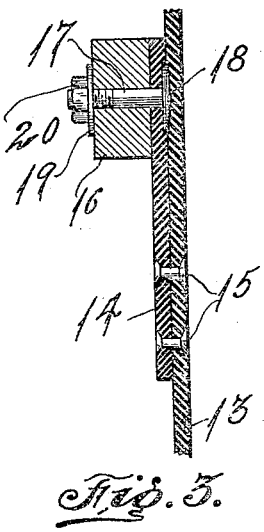
Figure 2:
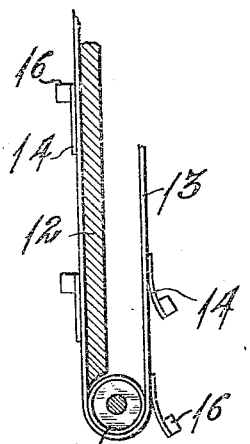

In the accompanying drawings, like characters of reference indicate like parts in the several views, and Figure 1 is a plan view of a conveyer constructed in accordance with this invention. Fig. 2 is a detail section on the line 2—2 of Fig. 1. Fig. 3 is an enlarged detail section through a portion of the conveyer showing the manner of securing the flights to the belts.

The numeral 10 indicates a frame for the conveyer of any preferred construction while the numeral 11 indicates the usual drums located at each end of the frame and over which the conveyer passes.

In the present instance there is indicated a conveyer of the drag flight type and there is consequently provided an apron 12. As will hereinafter appear, however, the manner of attaching the flight is independent of the type of conveyer employed.

At 13 is indicated a conveyer belt of any flexible material preferably of rubber. Attached to this conveyer belt are the ends of straps 14, the same being fixedly secured to the conveyer belt by means of rivets 15. The straps 14 are preferably of the same material as the conveyer belt and are furthermore of equal flexibility with the conveyer belt, being the same width and thickness as the belt. To the free ends of the straps 14 are attached conveyer flights 16 of any desired shape and form and these conveyer flights are connected to the free ends of the straps by means of a bolt 17 provided with a flat head 18 which rests beneath the straps and passes through a suitable aperture in the flight 16. The other end of the bolt 17 is provided with a washer 19 and a nut 20 so that the flight is securely attached to the straps 14 while at the same time by removing the nut and washer the flight may be readily detached from the straps. By means of this construction the belt in passing over the drums 11 does not tend to detach the conveyer from the belt but on the contrary the flexible strap 14 bends equally with the belt and being of elastic material yields longitudinally as well so that there is no tendency to detach the strap from the belt. The conveyer flight being mounted on the free end of the strap assumes the position clearly shown in Fig. 2 as it passes around and there is thus no tendency for the flight to be detached from the strap. It will further be observed that by means of this construction wherein the material of the belt is employed the tendency of the conveyer flight will be to lie close to the belt and this is assisted by having the strap flatly secured on the belt.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. The combination with a conveyer belt, of a flexible strap having one end flatly secured on the belt, and a conveyer flight secured to the free end of said strap.

2. The combination with a conveyer belt; of an uniformly flexible strap having one end flatly secured on the belt, and a conveyer flight secured to the free end of said strap.

3. The combination with a conveyer belt; of a flexible strap having the same width and thickness throughout and having one end secured to the belt, and a conveyer flight flatly secured on the free end of said strap.

4. The combination with a flexible conveyer belt; of a strap of flexible material similar in material and cross sectional dimensions to the belt and having one end secured on, and a conveyer flight flatly secured to the free end of said strap.

5. The combination with a conveyer belt; of a flexible strap having one end fixedly secured flat on the belt, and a conveyer flight detachably secured to the free end of said strap.

6. The combination with a conveyer belt; of an uniformly flexible strap having one end fixedly secured flat on the belt, and a conveyer flight detachably secured to the free end of said strap.

7. The combination with a flexible conveyer belt; of a strap of flexible material similar in material and cross sectional dimensions to the belt and having one end fixedly secured flat on, and a conveyer flight detachably secured to the free end of said strap.

8. In a conveyer, spaced conveyer belts, flexible straps secured in spaced relation to said belts, each of said straps having one of its ends fixedly secured to its respective belt, and conveyer flights extending transversely of said belts and detachably secured each to one of the straps on each of said belts.

9. The combination with a conveyer belt; of a flexible strap having one end riveted to the belt, a conveyer flight, and a bolt passing through the free end of said strap and the conveyer flight to detachably secure the flight to the free end of said strap.

In testimony whereof, I affix my signature, in presence of two witnesses.

ALBERT J. FRASE

Witnesses:
B. W. COLE,
P. F. GERGEN.